United States Patent [19]
Becker

[11] Patent Number: 5,848,614
[45] Date of Patent: Dec. 15, 1998

[54] SANITARY WATER FITTING

[75] Inventor: Albert Becker, Wittlich-Lüxem, Germany

[73] Assignee: American Standard Inc., Piscataway, N.J.

[21] Appl. No.: 773,443

[22] Filed: Dec. 18, 1996

[30] Foreign Application Priority Data

Jan. 10, 1996 [DE] Germany ......................... 196 00 646.5

[51] Int. Cl.⁶ ..................................................... E03C 1/04
[52] U.S. Cl. ........................................... 137/801; 137/615
[58] Field of Search ..................................... 137/615, 801

[56] References Cited

U.S. PATENT DOCUMENTS 5,301,715  4/1994  Becker ..................................... 137/615

Primary Examiner—Gerald A. Michalsky
Attorney, Agent, or Firm—Elaine Brenner Robinson; Joseph M. Homa

[57] ABSTRACT

A sanitary water fitting having a bearing ring arranged as a sliding bearing between the fitting body and the bearing sleeve. The bearing ring seals off a circling groove holding sealing rings from the bearing sleeve and is itself sealed off from the bearing sleeve by means of an external seal placed at the bearing ring. In its axial extension it borders a water passage opening which is between a circulating water channel and a swivel spout connection piece. The advantage of this invention is that the water flow in the circulating water channel and towards the swivel spout connection piece is controlled in such a way that the formation of lime deposits in the area of the sealing rings is considerably limited even after a relatively long period of operation, or even prevented completely. Since the water can no longer get in between the parts moving in relation to each other and the bearing ring itself helps to protect the sealing rings, there is no longer a possibility of serious levels of lime deposits settling in this sensitive area.

15 Claims, 2 Drawing Sheets

SANITARY WATER FITTING

BACKGROUND OF INVENTION

The present invention is directed to a sanitary water fitting having a swivel support connection piece of which one end extends into a bearing sleeve which encases a stationary fitting body. The bearing sleeve is pivoted on the fitting body by means of at least one bearing ring and which together with the fitting body forms a circulating water channel, which is closed off by means of sealing rings. A valve regulating unit is mounted on top of the fitting body which is connected to water inlet channels in the fitting body and is also connected to the circulating water channel via a water outlet channel. The circulating water channel leading to the arm of the swivel outlet connection piece is bordered by circling collars whose surfaces form part of the wall of a circling groove holding the sealing rings.

In known sanitary water fittings, such as that disclosed in U.S. Pat. No. 5,301,715, an upper and a lower bearing ring is provided for pivoting the swing spout connection piece on the fitting body in its external overlapping areas. These bearing rings are preferably made of sliding, long-wearing plastic. In the central area between the bearing rings, the swivel spout connection piece is seated, in direct contact with the sealing rings.

One disadvantage of such a construction is that, depending on the respective water quality and in particular the water hardness levels of the area, lime deposits can form in the waterways inside the fitting after a short period of operation. This makes it increasingly difficult for the swivel spout connection piece to move in relation to the fitting body, especially in the area of the sealing rings. Furthermore, if the necessary force is used to turn the swing spout connection piece, damage can occur to the sealing rings resulting in leaks from the waterways.

SUMMARY OF THE INVENTION

It is therefore an object of the invention to eliminate the aforesaid disadvantage and provide a sanitary water fitting of simple construction and reliable function.

These and other objects are achieved by the present invention which provides a sanitary water fitting having a bearing ring arranged as a sliding bearing between the fitting body and the bearing sleeve. The bearing ring seals off a circling groove holding sealing rings from the bearing sleeve and is itself sealed off from the bearing sleeve by means of an external seal placed at the bearing ring. In its axial extension it borders a water passage opening which is between a circulating water channel and a swivel spout connection piece. The advantage of this invention is that the water flow in the circulating water channel and towards the swivel spout connection piece is controlled in such a way that the formation of lime deposits in the area of the sealing rings is considerably limited even after a relatively long period of operation, or even prevented completely. Since the water can no longer get in between the parts moving in relation to each other and the bearing ring itself helps to protect the sealing rings, there is no longer a possibility of serious levels of lime deposits settling in this sensitive area.

In accordance with an embodiment of the invention, a swivel spout connection piece is held to the fitting body by means of two partial rings which are each formed in the same way and arranged symmetrically in relation to the circulating water channel. These partial rings can either be connected together to form a one-piece ring element or two bearing rings can be provided which can also be arranged separately from one another and inserted during assembly.

The bearing ring edge which borders the passage opening can on its surface bordering the circulating water channel be bevelled into the passage opening and outwards towards the swivel spout connection piece. The formation of the appropriate edge serves to regulate the water flow as desired without the water streaming onto the sealing rings in the turbulent area.

BRIEF DESCRIPTION OF THE DRAWINGS

The invention will be more fully appreciated from the following detailed description when the same is considered in connection with the accompanying drawings in which.

DETAILED DESCRIPTION OF THE INVENTION

Figure 1:
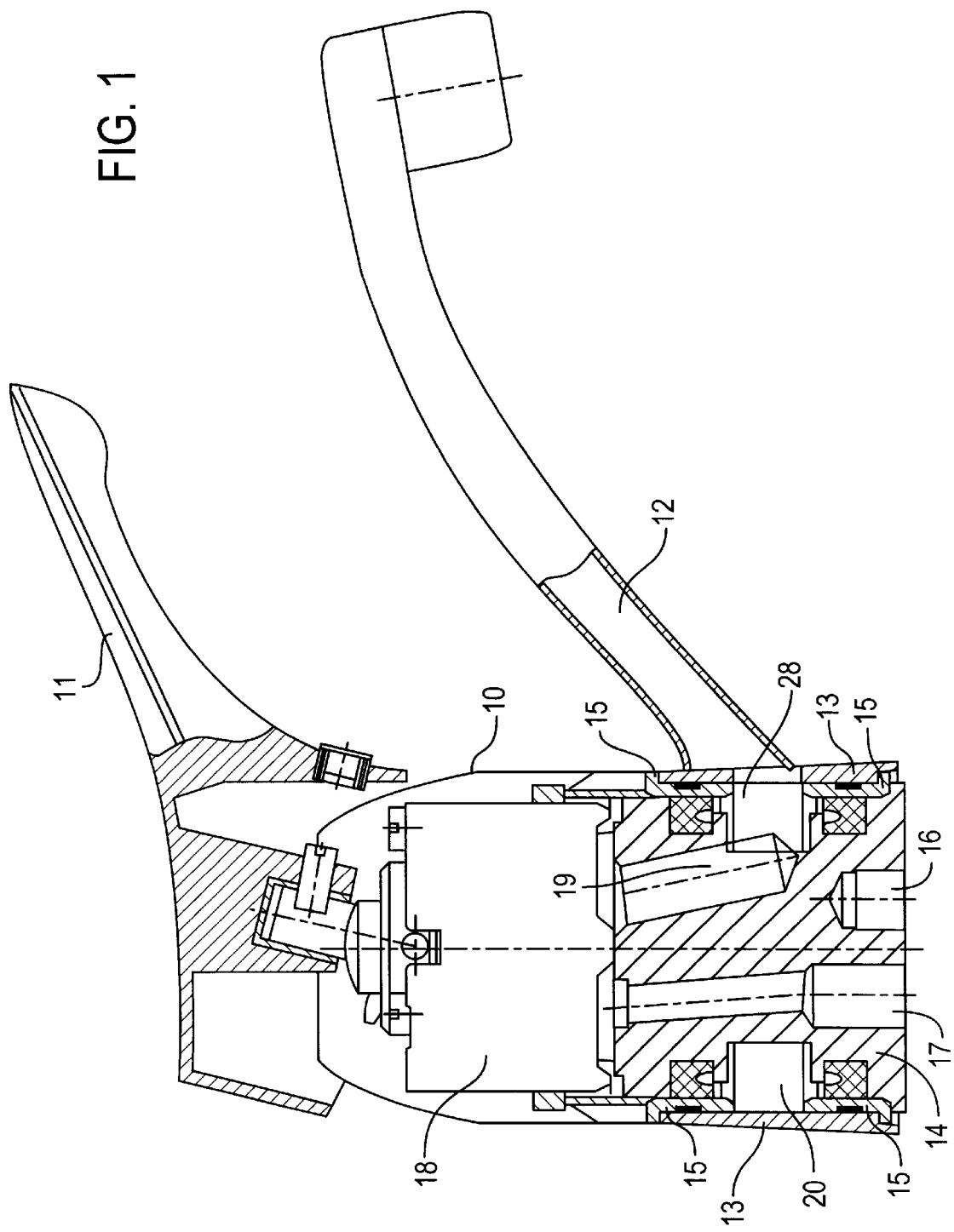
FIG. 1 is a sectional side view of a sanitary water fitting in accordance with the claimed invention.
Figure 2:
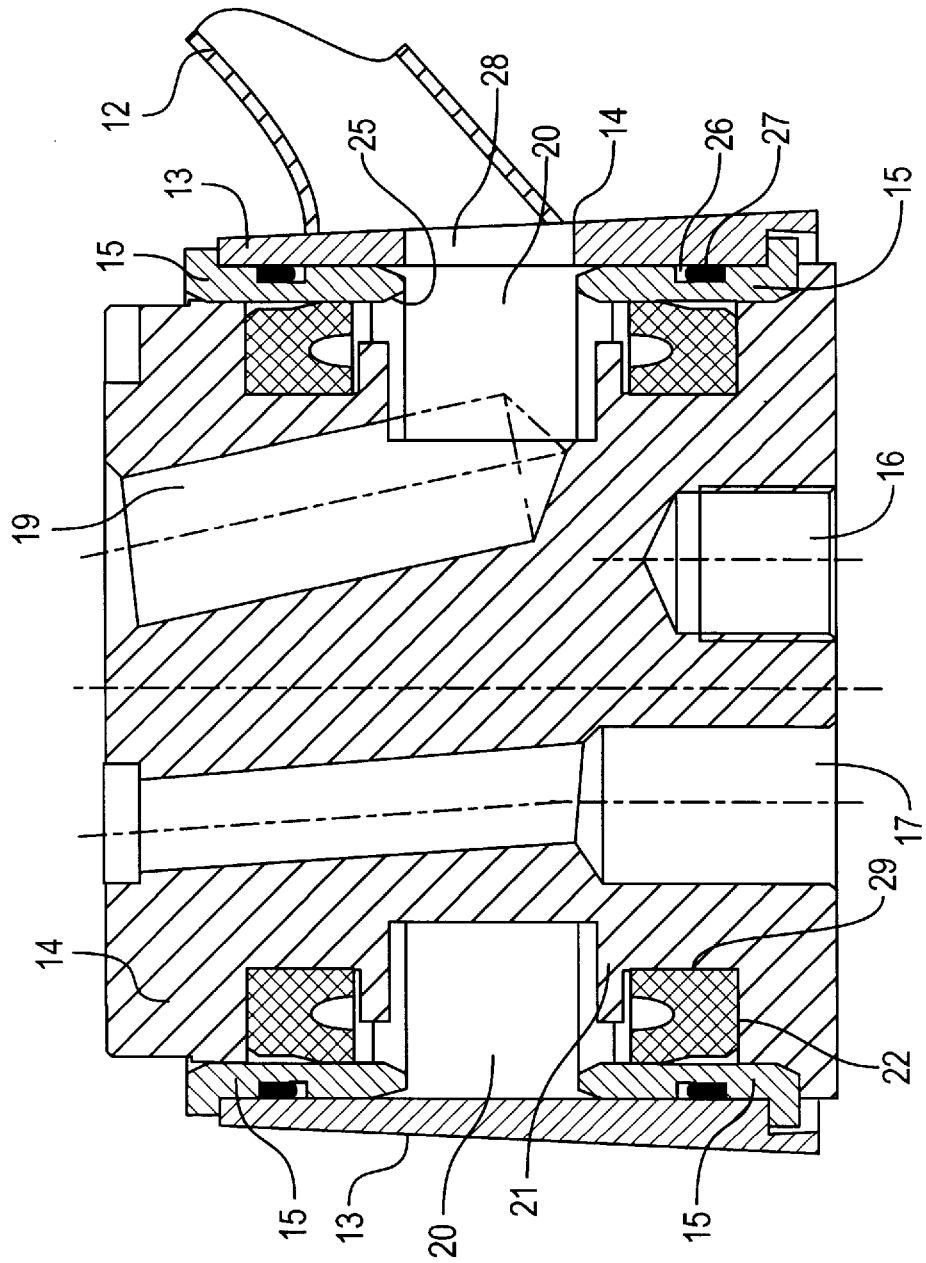
FIG. 2 is an enlarged sectional representation of the fitting in FIG. 1 showing the water channels.

Reference is now made to FIG. 1 which shows a sanitary water fitting having a fitting casing 10 on which a swivel lever 11 is mounted for regulating quantity and temperature. The fitting has a swivel spout connection piece 12 which is located on a bearing sleeve 13, which is pivoted on a stationary fitting body 14, whereby the bearing sleeve 13 is pivoted on the fitting casing 10 and the fitting body 14 by means of bearing rings 15, described below in detail.

The fitting body 14 and thus the sanitary water fitting is mounted by means of a stud bolt 16 to a sink (not shown). The water inlet 17 enters from underneath the fitting body 14 and leads to a cartridge 18 placed in the fitting casing 10. The swivel lever 11 is connected to cartridge 18 to regulate the water quantity and temperature.

From cartridge 18 a water outlet channel 19 leads to a circulating water channel 20 formed in the fitting body 14. The circulating water channel is connected to the swivel spout connection piece 12 in the sanitary water fitting by means of a hole 28 so that the mixed water coming from cartridge 18 can flow out swivel spout connection piece 12. The circulating water channel 20 is bordered in the fitting body 14 by circling collars 21, whose surfaces which are not facing each other simultaneously form part of the wall for a circling groove 29 in which sealing rings 22 are fitted, which seal off the circulating water channel 20.

Between the fitting body 14 and the bearing sleeve 13 there are bearing rings 15, one upper and one lower ring, to enable the swivel spout connection piece 12 to be pivoted on the fitting body 14. Each bearing ring 15 seals off the circling groove 29 and the sealing ring 22 located in grove 29. Each bearing ring 15 is itself sealed off from the bearing sleeve 13 by means of a seal 27 placed in a circling groove 26. The two bearing rings 15 form a boundary by their axial extensions with end edges 24 for the water passage hole 28 between the circulating water channel 20 and the swivel spout connection piece 12. In order to regulate favorable flow conditions the corresponding surfaces of both bearing rings 15 are bevelled 25 into the water passage hole 28 and outwards towards the swivel spout connection piece 12. As a result, the water flowing through passage hole 28 is kept away or diverted from the remaining contact surface with sealing ring 22 between circling collar 21 and bearing ring 15. Since there is a seal both between fitting body 14 and bearing ring 15 and between the bearing ring 15 and the bearing sleeve 13, the water cannot get in between the components which turn in relation to each other so that lime deposits, which would cause difficulties, cannot settle.

Although illustrative embodiments of the present invention have been described herein with reference to the accompanying drawings, it is to be understood that the invention is not limited to these precise embodiments, and that various other changes and modifications may be effected herein by one skilled in the art without departing from the scope or spirit of the invention.

What is claimed is:

1. A sanitary fitting comprising:

a stationary fitting body including circling collars projecting radially outwardly, said fitting body being provided with an inlet channel, an outlet channel, and circling grooves, wherein said circling collars define part of said circling grooves, and wherein said circling collars define part of a circulating water channel therebetween;

sealing rings disposed in said circling grooves;

at least one bearing ring disposed around said stationary fitting body, said at least one bearing ring defining part of said circulating water channel;

a bearing sleeve which surrounds said fitting body and said at least one bearing ring and which is pivotable upon said at least one bearing ring, said bearing sleeve being provided with a water passage hole adjacent said circulating water channel, wherein said at least one bearing ring is interposed between said bearing sleeve and said circling grooves;

a swivel spout connection piece having an arm which extends into said bearing sleeve and surrounds said water passage hole; and a valve control unit mounted on said fitting body and connected to said inlet and outlet channels and to said circulating water channel via said outlet channel, said circulating water channel leading to said arm of said swivel spout connection piece.

2. The sanitary fitting in accordance with claim 1 wherein said at least one bearing ring comprises an upper part and a lower part, each said part arranged symmetrically in relation to said circulating water channel.

3. The sanitary fitting in accordance with claim 1 wherein said at least one bearing ring comprises an upper bearing ring and a lower bearing ring.

4. The sanitary fitting in accordance with claim 1 wherein said at least one bearing ring borders said water passage hole and includes a beveled edge which borders said circulating water channel outwards towards said swivel spout connection piece.

5. A sanitary fitting comprising:

a stationary fitting body having a generally cylindrical outer periphery which includes a circling collar which projects radially outwardly and which at least partially defines a circulating water channel circumferentially disposed about the outer periphery, said fitting body further being provided with an inlet channel, an outlet channel, and a circling groove disposed at least partially around the outer periphery of said fitting body, wherein said circling collar at least partially separates said circling groove from said circulating water channel and defines part of said circling groove, and wherein said outlet channel intersects with said circulating water channel to allow fluid communication therebetween;

a sealing ring disposed in said circling groove in said fitting body;

a bearing sleeve which surrounds said fitting body, said bearing sleeve defining part of said circulating water channel, said bearing sleeve being provided with a water passage hole adjacent said circulating water channel to allow fluid flow therethrough;

a swivel spout connection piece having one end attached to said bearing sleeve over said water passage hole, thereby allowing fluid flow from said circulating water channel into said swivel spout connection piece; and at least one bearing ring disposed between said bearing sleeve and said sealing ring, said at least one bearing ring abutting said bearing sleeve and said sealing ring, wherein said at least one bearing ring overlays said sealing ring and said circling groove, and wherein part of said at least one bearing ring defines part of said circulating water channel;

wherein said swivel spout connection piece and said bearing sleeve are pivotable about said fitting body by sliding contact between said bearing sleeve and said at least one bearing ring;

whereby contact between said bearing sleeve and said sealing ring is prevented by the interposition of said at least one bearing ring between said bearing sleeve and sealing ring.

6. The sanitary fitting in accordance with claim 5 wherein said at least one bearing ring has an outer periphery which is provided with a bearing circling groove; and further comprising a circumferential seal disposed in said bearing circling groove, thereby providing sealing between said bearing sleeve and said at least one bearing ring.

7. The sanitary fitting in accordance with claim 6 wherein the part of said at least one bearing ring which borders said water passage hole comprises a beveled edge which slopes toward said bearing sleeve.

8. The sanitary fitting in accordance with claim 5 wherein part of said at least one bearing ring borders said water passage hole.

9. The sanitary fitting in accordance with claim 5 wherein said at least one bearing ring comprises an upper bearing ring and a lower bearing ring disposed on opposite sides of said water circulating channel.

10. A sanitary fitting comprising:

a stationary fitting body having a generally cylindrical outer periphery which includes a pair of circling collars which project radially outwardly and which at least partially define therebetween a circulating water channel circumferentially disposed about the outer periphery, said fitting body further being provided with an inlet channel, an outlet channel, and a pair of circling grooves each disposed at least partially around the outer periphery of said fitting body on opposite sides of said circulating water channel, wherein each said circling collar at least partially separates a respective said circling groove from said circulating water channel and defines part of said respective circling groove, and wherein said outlet channel intersects with said circulating water channel to allow fluid communication therebetween;

a valve control unit mounted on said fitting body and connected to said inlet and outlet channels;

a pair of sealing rings each disposed in a respective said circling groove in said fitting body;

a bearing sleeve which surrounds said fitting body, said bearing sleeve defining part of said circulating water channel, said bearing sleeve being provided with a water passage hole adjacent said circulating water channel to allow fluid flow therethrough;

a swivel spout connection piece having one end attached to said bearing sleeve over said water passage hole, thereby allowing fluid flow from said circulating water channel into said swivel spout connection piece; and at least one bearing ring disposed between said bearing sleeve and said sealing rings, said bearing ring abutting said bearing sleeve and said sealing ring, wherein said at least one bearing ring overlays each of said sealing rings and respective circling grooves, wherein part of said at least one bearing ring defines part of said circulating water channel;

wherein said swivel spout connection piece and said bearing sleeve are pivotable about said fitting body by sliding contact between said bearing sleeve and said at least one bearing ring;

whereby contact between said bearing sleeve and said sealing rings is prevented by the interposition of said at least one bearing ring between said bearing sleeve and sealing rings.

11. The sanitary fitting in accordance with claim 9 wherein said at least one bearing ring comprises a first bearing part disposed over one of said sealing rings and a second bearing part which covers the other one of said sealing rings, wherein said first and second parts are attached to one another.

12. The sanitary fitting in accordance with claim 9 wherein said at least one bearing ring comprises two bearing rings for covering respective said sealing rings.

13. The sanitary fitting in accordance with claim 9 wherein said at least one bearing ring is provided with a bearing circling groove on an outer periphery thereof; and further comprising a seal disposed in said bearing circling groove, thereby providing sealing between said bearing sleeve and said bearing ring.

14. The sanitary fitting in accordance with claim 13 wherein the part of said at least one bearing ring which borders said water passage hole comprises a beveled edge which slopes toward said bearing sleeve.

15. The sanitary fitting in accordance with claim 9 wherein part of said at least one bearing ring borders said water passage hole.

\* \* \* \* \*